(12) United States Patent
Jeong

(10) Patent No.: US 8,451,515 B2
(45) Date of Patent: May 28, 2013

(54) IMAGE READER AND IMAGE FORMING APPARATUS

(75) Inventor: JiYoung Jeong, Incheon (KR)

(73) Assignee: Fuji Xerox Co., Ltd., Tokyo (JP)

( * ) Notice: Subject to any disclaimer, the term of this patent is extended or adjusted under 35 U.S.C. 154(b) by 331 days.

(21) Appl. No.: 12/856,927

(22) Filed: Aug. 16, 2010

(65) Prior Publication Data

US 2011/0090544 A1    Apr. 21, 2011

(30) Foreign Application Priority Data

Oct. 19, 2009 (JP) ................................. 2009-240419

(51) Int. Cl.
*H04N 1/04*        (2006.01)
(52) U.S. Cl.
USPC ............ 358/496; 358/481; 358/494; 358/474

(58) Field of Classification Search
USPC ................... 358/496, 481, 494, 474
See application file for complete search history.

(56) References Cited

U.S. PATENT DOCUMENTS

2008/0158533 A1*   7/2008   Shimizu et al. ................. 355/66

FOREIGN PATENT DOCUMENTS

JP         A 6-258882         6/1994

* cited by examiner

*Primary Examiner* — Houshang Safaipour
(74) *Attorney, Agent, or Firm* — Oliff & Berridge, PLC

(57) ABSTRACT

An image reader includes a light source, a light reception element, an optical member, and a hold body. The light source applies light to a document. The light reception element receives reflected light reflected by the document. The optical member introduces the reflected light into the light reception element. The hold body has an entry part which is disposed in a portion not contributing to image formation of the reflected light on the light reception element through the optical member. The hold body holds the optical member.

9 Claims, 7 Drawing Sheets

IMAGE READER AND IMAGE FORMING APPARATUS

CROSS-REFERENCE TO RELATED APPLICATIONS

This application is based upon and claims priority under 35 USC 119 from Japanese Patent Application No. 2009-240419, filed Oct. 19, 2009.

BACKGROUND

1. Technical Field

This invention relates to an image reader and an image forming apparatus.

2. Summary of the Invention

According to an aspect of the invention, an image reader includes a light source, a light reception element, an optical member, and a hold body. The light source applies light to a document. The light reception element receives reflected light reflected by the document. The optical member introduces the reflected light into the light reception element. The hold body has an entry part which is disposed in a portion not contributing to image formation of the reflected light on the light reception element through the optical member. The hold body holds the optical member.

BRIEF DESCRIPTION OF THE DRAWINGS

Exemplary embodiments of the invention will be described in detail based on the following figures, wherein.

DETAILED DESCRIPTION

A preferred exemplary embodiment of an image forming apparatus including an image reader according to the invention will be discussed.

(Configuration of Image Forming Apparatus 100)

Figure 1:
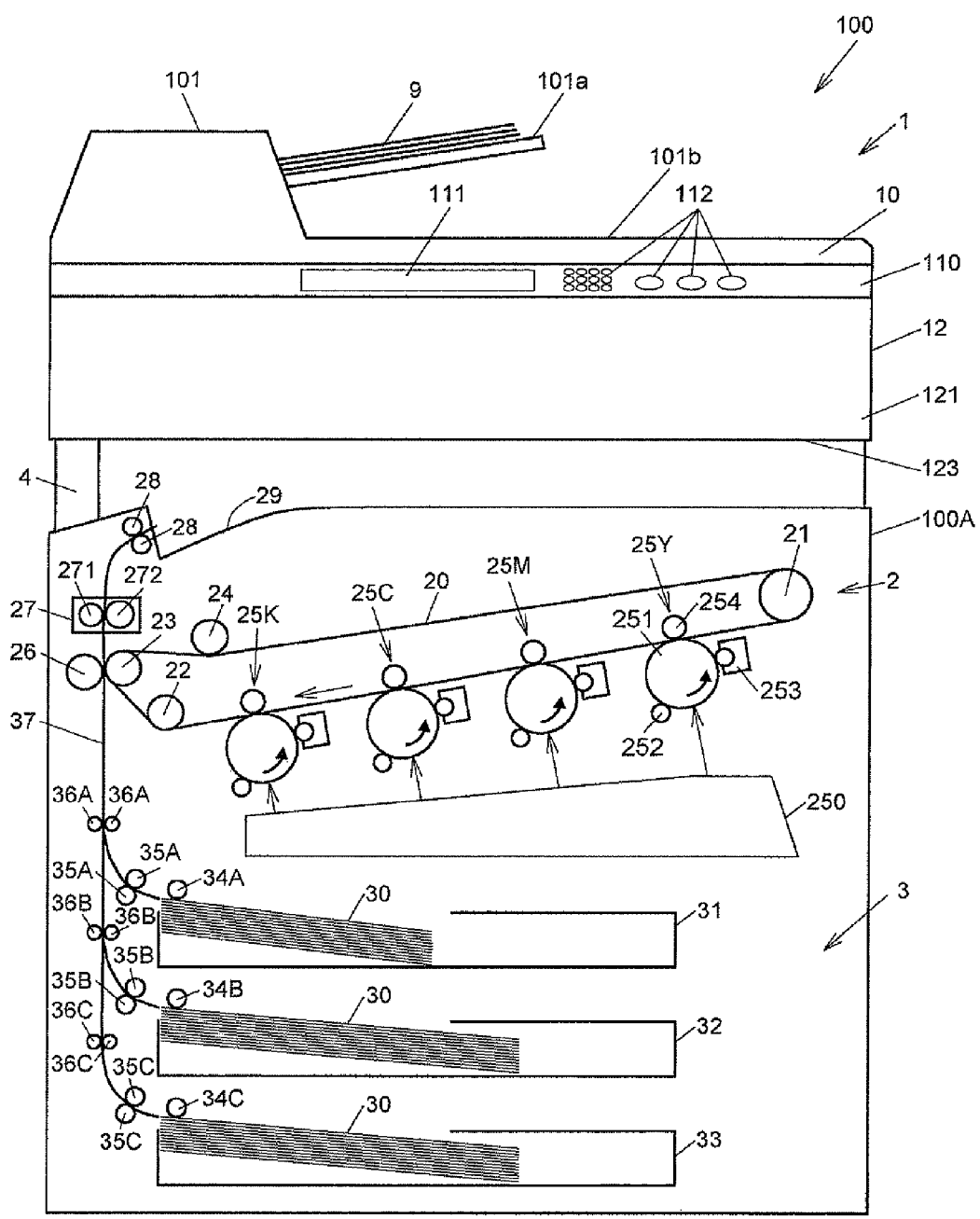
FIG. 1 is a front view to show a configuration example of an image forming apparatus having an image reader according to an exemplary embodiment of the invention.

FIG. 1 is a front view of an image forming apparatus 100 according to an exemplary embodiment of the invention and shows the appearance of an image reader 1 and the internal structure of a main body section 100A placed below the image reader 1.

The image forming apparatus 100 is made up of the image reader 1 for reading an image from a document 9, an image forming section 2 for printing the read image on a sheet 30 as a record medium, and a tray section 3 for supplying a sheet to the image forming section 2. The image reader 1 is supported above the main body section 100A by a support section 4 so as to form a space where a printed sheet is discharged between the image reader 1 and the main body section 100A housing the image forming section 2 and the tray section 3.

A touch panel 111 for presenting an operation menu to the user and accepting operation of various settings, etc., and a control panel 110 having a plurality of operation buttons are provided on the top of a front wall 121 corresponding to the front of a cabinet 12 of the image reader 1. A document cover 10 that may be opened and closed relative to the cabinet 12 is placed above the control panel 110. An automatic sheet feed section 101 for conveying the document 9 placed in a sheet feed tray 101a to a read position and discharging the document 9 after read to a sheet discharge bed 101b is provided in a part of the document cover 10.

The image forming section 2 includes an intermediate transfer belt 20, first to fourth image forming units 25Y, 25M, 25C, and 25K for transferring color toner images of yellow (Y), magenta (M), cyan (C), and black (K) to the intermediate transfer belt 20, and an optical scanner 250 for applying laser light modulated based on image information to the first to fourth image forming units 25Y, 25M, 25C, and 25K.

The first image forming unit 25Y has a photoconductive drum 251, a charger 252 for uniformly charging the surface of the photoconductive drum 251, a developing device 253 for developing an electrostatic latent image formed by the optical scanner 250 in toner to form a toner image, and a primary transfer roller 254 for pressing the intermediate transfer belt 20 against the photoconductive drum 251. The second to fourth image forming units 25M, 25C, and 25K also have each a similar configuration to that of the first image forming unit 25Y.

The intermediate transfer belt 20 is driven by a drive motor 21 joined to a motor (not shown) and rotates along a circulation path formed by a first driven roller 22, a second driven roller 23, and a tension roller 24 for giving tension to the intermediate transfer belt 20.

The image forming section 2 includes a secondary transfer roller 26 placed at a position opposed to the second driven roller 23 across the intermediate transfer belt 20, a fixing unit 27 placed above the secondary transfer roller 26, and a discharge roller 28 for discharging a sheet passing through the fixing unit 27 to a discharge bed 29. The fixing unit 27 includes a fixing roller 271 containing a heater and a press roller 272 pressed against the fixing roller 271.

The tray section 3 has first to third trays 31 to 33 placed in the up and down direction. A plurality of trays 31 to 33 are provided to store sheets different in orientation, size, sheet quality, etc., for each type.

The tray section 3 includes pickup rollers 34A, 34B, and 34C for taking out stored sheets 30, separation rollers 35A, 35B, and 35C for separating a plurality of sheets 30 when they are taken out, and registration rollers 36A, 36B, and 36C for further conveying the sheets passing through the separation rollers 35A, 35B, and 35C corresponding to the first to third trays 31 to 33.

The registration rollers 36A, 36B, and 36C operate in synchronization with the image forming timing of the image forming section 2 and introduce the sheets 30 taken out by the pickup rollers 34A, 34B, and 34C from the first to third trays 31 to 33 into space between the secondary transfer roller 26 and the intermediate transfer belt 20 along a conveying passage 37.

(Configuration of Image Reader 1)

Figure 2:
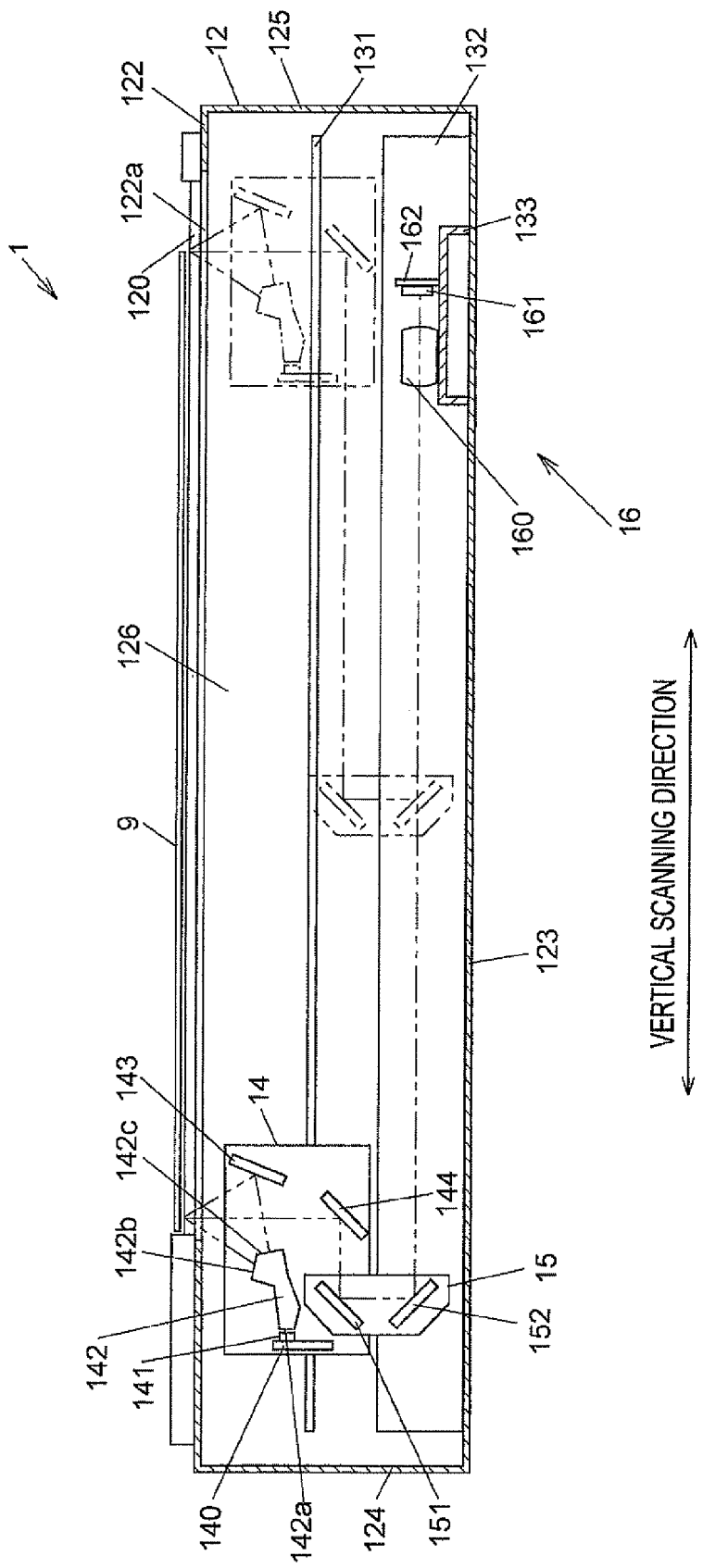
FIG. 2 is a front view to show the internal structure of the image reader according to the exemplary embodiment of the invention.

FIG. 2 is a front view to show the internal structure of the image reader 1. In the figure, the front wall 121 of the cabinet 12, the document cover 10, and the like are not shown.

The image reader 1 is made up of first and second carriages 14 and 15 provided so that they may reciprocate in a vertical scanning direction (left-right direction in FIG. 2) and an image read section 16 made up of a lens 160 provided below a turn-back position in the vertical scanning direction, a CCD (Charge Coupled Device) 161 as a light reception element, etc., in the cabinet 12.

The cabinet 12 has an upper wall 122, a bottom wall 123 opposed to the upper wall 122, side walls 124 and 125 opposed to each other in the vertical scanning direction across the bottom wall 123, and a front wall 121 (see FIG. 1) and a back wall 126 opposed to each other in a horizontal scanning direction (direction orthogonal to the plane of FIG. 2), and is formed roughly like a rectangular box.

The upper wall 122 opposed to the document cover 10 (see FIG. 1) is formed with an opening 122a corresponding to a read position where the document 9 is placed. Transparent platen glass 120 is fitted so as to close the opening 122a. If the document 9 is placed on the platen glass 120, the first and second carriages 14 and 15 move, whereby an image is read and scanned.

A first rail 131 extending in the vertical scanning direction is fixed to the back wall 126. A second rail 132 extending in the vertical scanning direction in parallel with the first rail 131 is fixed to the bottom wall 123. Two first rails 131 and two second rails 132 are placed side by side in the horizontal scanning direction, but only one is shown in FIG. 2.

The first carriage 14 includes a base plate 140 with the horizontal scanning direction as the length direction, a plurality of LEDs 141 arranged in a row along the horizontal scanning direction as a light source mounted on the base plate 140 for applying light to the document 9 at the read position, a light guide body 142 extending in the horizontal scanning direction so as to become parallel with the base plate 140, a reflector 143 for reflecting a part of emission light from the light guide body 142 toward the document 9, and a mirror 144 for receiving reflected light from the document 9; they are placed at predetermined positions.

The first carriage 14 is moveably attached to the first rails 131. That is, the first carriage 14 is guided to the first rails 131 together with the components of the light guide body 142, etc., and moves one scan line at a time in the vertical scanning direction and emits reflected light from the document 9 to the second carriage 15 at the following stage.

The light guide body 142 is a rod-like polyhedron formed of a material having optical transparency such as acrylic and has an incidence face 142a on which light from the LEDs 141 is incident, a first emission face 142b for internally reflecting and refracting a part of the incidence light incident from the incidence face 142a and emitting the light part to the document 9, and a second emission face 142c for emitting the incidence light to the reflector 143.

The second carriage 15 includes a first mirror 151 for receiving light from the mirror 144 of the first carriage 14 and a second mirror 152 for receiving reflected light from the first mirror 151. Although described later in detail, the mirrors are placed at predetermined positions described later so that the first mirror 151 receives the light incident through the first carriage 14 and reflects the light to the second mirror 152 and the second mirror 152 reflects the reflected light toward the image read section 16.

The second carriage 15 is moveably attached to the second rails 132. The second carriage 15 may reciprocate along the vertical scanning direction while it is guided by the second rails 132 in operative association with the first carriage 14.

That is, the first carriage 14 and the second carriage 15 are driven by a drive mechanism (not shown) so that the optical path length from the read position of an image to the CCD 161 described later becomes constant, and the move amount of the second carriage 15 is a half of the move amount of the first carriage 14. FIG. 2 shows the first and second carriages 14 and 15 when the first carriage 14 moves to the turn-back position in the vertical scanning direction by alternate long and two short dashes lines.

The image read section 16 includes a lens 160 for gathering reflected light from the second carriage 15 and the CCD (Charge Coupled Device) 161 of a light reception element mounted on the base plate 162 for detecting light gathered through the lens 160. The lens 160 and the CCD 161 are fixed at predetermined positions on a base board 133 supported on the second rails 132 so that reflected light containing image information reflected on the document 9 forms an image in the CCD 161.

The image read section 16 converts image information for each scan line of the document 9 into image data as the CCD 161 detects reflected light containing image information of the document 9 emitted through the first and second carriages 14 and 15, and outputs the image data to a control section of the image reader 1.

(Configuration of Second Carriage 15)

Next, the configuration of the second carriage 15 included in the image reader described above will be discussed.

Figure 3:
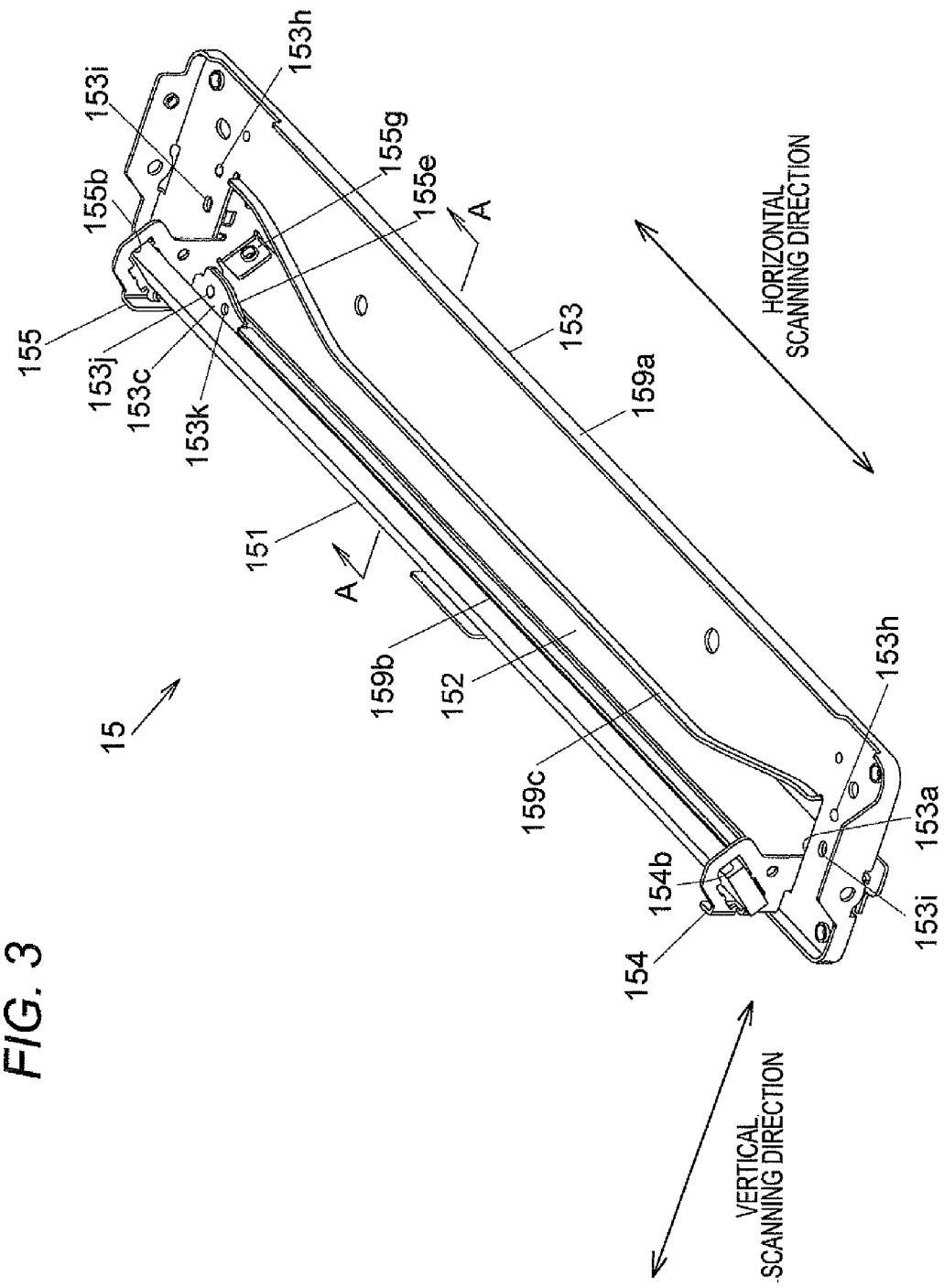
FIG. 3 is a perspective view to show the appearance of a second carriage according to the exemplary embodiment of the invention.
Figure 4:
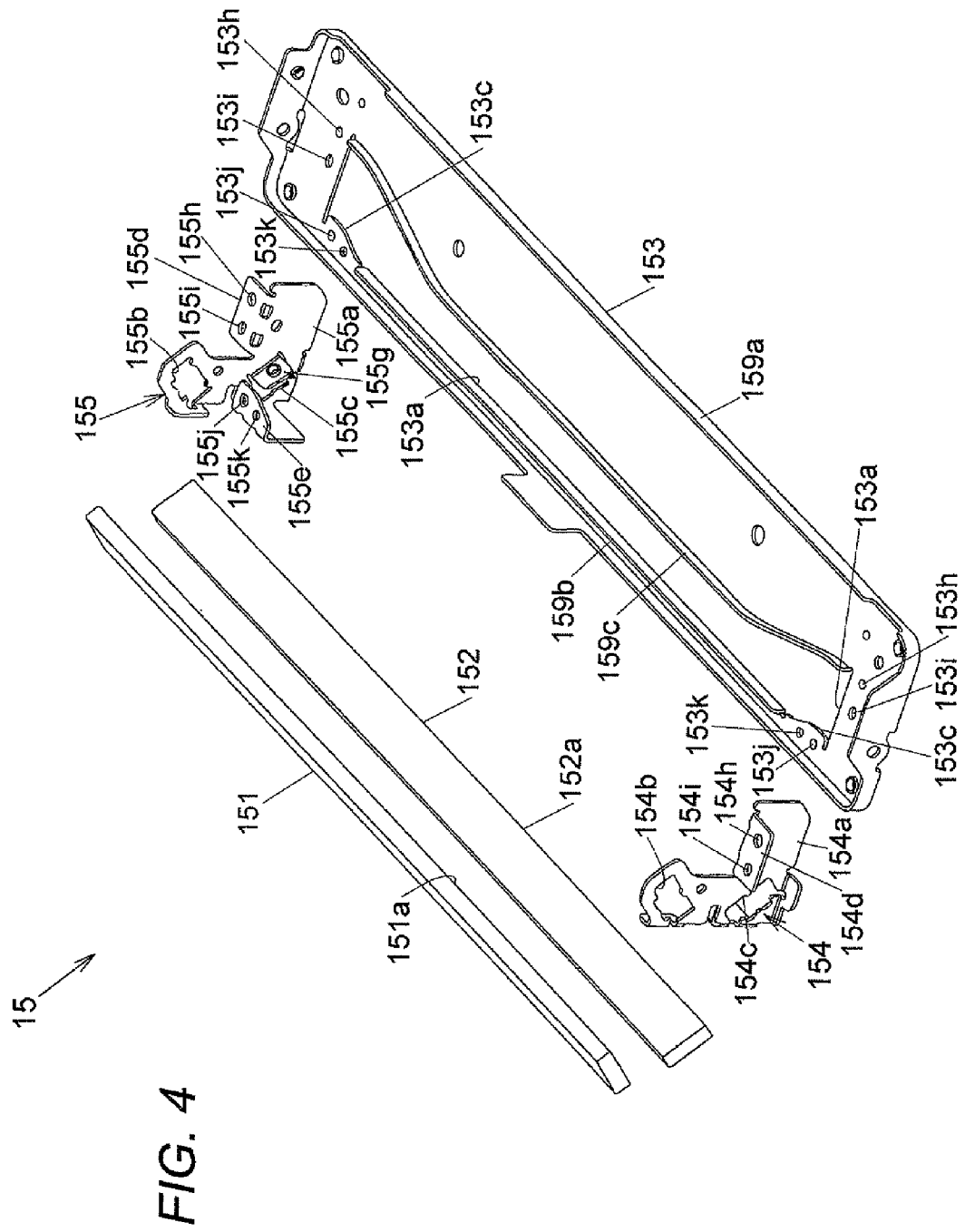
FIG. 4 is an exploded perspective view to show main members of the second carriage in a disassembly state according to the exemplary embodiment of the invention.

FIG. 3 is a perspective view to show the appearance of the second carriage 15. FIG. 4 is an exploded perspective view to show main members of the second carriage 15 in a disassembly state.

The second carriage 15 includes the first mirror 151 and the second mirror 152 opposed to each other at an angle of 90 degrees, a carriage frame 153 as a frame, and first and second holders 154 and 155 as support members for supporting the first and second mirrors 151 and 152. The carriage frame 153 and the first and second holders 154 and 155 make up a hold body for holding the first and second mirrors 151 and 152.

The carriage frame 153 is formed by performing sheet-metal working of a metal plate of steel material, aluminum, etc., for example. The carriage frame 153 is a long member roughly like a plate with the horizontal scanning direction (front and back direction) as the length direction and is formed with a long opening 153a roughly like a quadrangle along the horizontal scanning direction at a position slightly to the left at the center. The opening 153a is formed corresponding to a position passing through a space 41 (see FIG. 6) formed as the first and second mirrors 151 and 152 are opposed to each other when the mirrors 151 and 152 are supported on the carriage frame 153.

The carriage frame 153 is formed with fixing holes 153h and 153j and positioning holes 153u and 153j for attaching the first and second holders 154 and 155 each four (eight points in total) in both end parts in the length direction of the frame.

As shown in FIG. 4, the carriage frame 153 is formed integrally with two entry parts 153c where the left margin on both end sides of the quadrangular opening 153a enters so as to expand inward. The fixing holes 153j and the positioning holes 153k are formed in the entry parts 153c. The fixing holes 153h and the positioning holes 153i are formed in front and back margins adjacent to the margin of the opening 153a where the entry parts 153c are formed.

The carriage frame 153 is formed with a rib 159a shaped as the outer margin of the main body is bent upward, a rib 159b shaped as the left margin of the opening 153a is bent upward, and a rib 159c shaped as the right margin of the opening 153a is bent upward.

The first and second holders 154 and 155 are support members for supporting the end parts of the first and second mirrors 151 and 152 and fixing them to the carriage frame 153 and are formed by performing sheet-metal working of a metal plate.

Figure 5A:
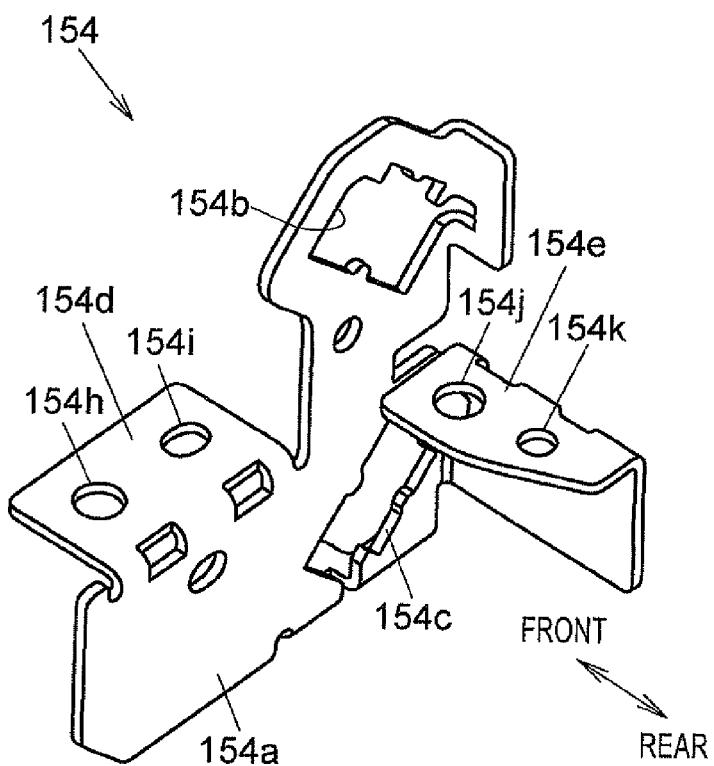
FIGS. 5A and 5B are perspective views to the appearances of first and second holders respectively according to the exemplary embodiment of the invention.
Figure 5B:
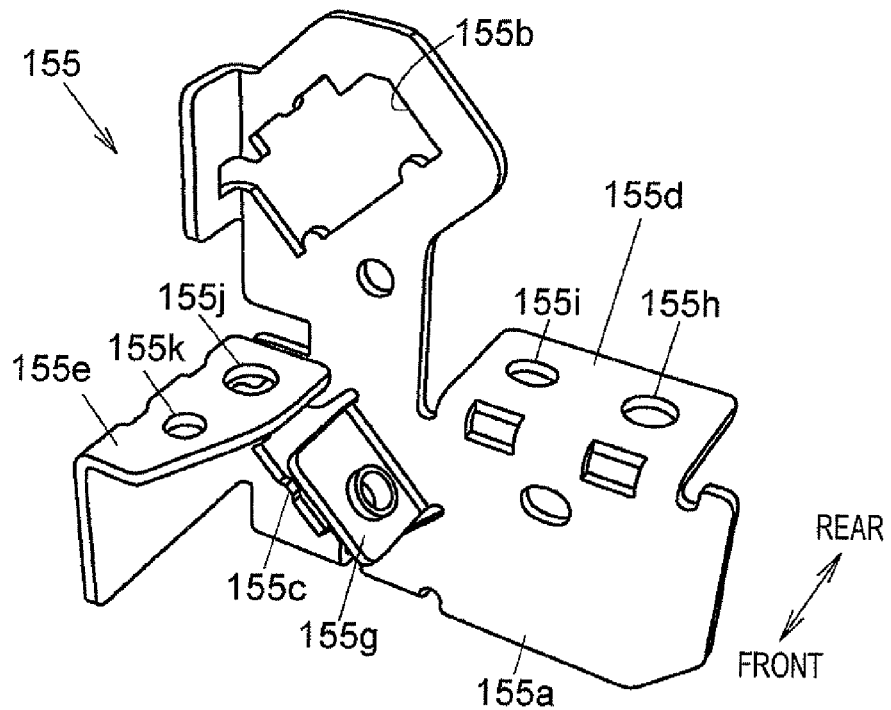

FIGS. 5A and 5B are perspective views to the appearances of the first and second holders 154 and 155 respectively.

As shown in FIG. 5A, the first holder 154 is formed with rectangular openings 154b and 154c to insert and support one end part of each of the first mirror 151 and the second mirror 152 on a base plate 154a shaped like letter L on a plan view. The first holder 154 is formed integrally with a first bracket part 154d turned to the outside from the base plate 154a, and the bracket part 154d is formed with the fixing hole 154h and the positioning hole 154i.

Further, the first holder 154 is formed integrally with a second bracket part 154e shaped like letter L in cross section turned and extended backward from one end of the base plate 154a and further with the upper end turned to the inside. The second bracket part 154e is formed with the fixing hole 154j and the positioning hole 154k.

As shown in FIG. 5B, the second holder 155 is formed as it is shaped almost bilateral symmetrical with the first holder 154. That is, the second holder 155 is formed with openings 155b and 155c to insert the first and second mirrors 151 and 152 into a base plate 155a and is formed integrally with a first bracket part 155d turned to the outside from the base plate 155a and a second bracket part 155e shaped like letter L in cross section turned and extended forward from one end of the base plate 155a and further with the upper end turned to the inside. The first bracket part 155d is formed with a fixing hole 155h and a positioning hole 155i, and the second bracket part 155e is formed with a fixing hole 155j and a positioning hole 155k.

Further, the second holder is formed integrally with a mirror fixing part 155g in an upper margin part of the opening 155b.

(Assembling Method of Second Carriage

Next, an example of an assembling method of the main part of the second carriage 15 will be discussed. The first holder 154 is attached to the front side of the opening 153a of the carriage frame 153. That is, the top part of the first holder 154 is inserted from the lower side of the opening 153a, the fixing hole 154h and the positioning hole 154i of the first bracket part 154d and the fixing hole 153h and the positioning hole 153i of the carriage frame 153 corresponding to the holes are matched, and at the same time, the fixing hole 154j and the positioning hole 154k of the second bracket part 154e and the fixing hole 153j and the positioning hole 153k of the entry part 153c corresponding to the holes are matched. A pin 157 (see FIG. 6) is inserted into the positioning holes 153i and 154i and the positioning holes 153k and 154k and is positioned and then a rivet 156 (see FIG. 6) is inserted into the fixing holes 153h and 154h and the fixing holes 153j and 154j and is crimped, whereby the first holder 154 is fixed to a predetermined position of the carriage frame 153.

The first holder 154 is fixed to the carriage frame 153 from both sides with the two bracket parts 154d and 154e across the base plate 154a of the main body, whereby the bending rigidity of the first holder 154 relative to the carriage frame 153 more improves as compared with the case where the second bracket part 154e does not exist.

Likewise, for the second holder 155, on the back side of the carriage frame 153, the fixing hole 155h and the positioning hole 155i of the first bracket part 155d and the fixing hole 153h and the positioning hole 153i of the carriage frame 153 corresponding to the holes are matched and at the same time, the fixing hole 155j and the positioning hole 155k of the second bracket part 155e and the fixing hole 153j and the positioning hole 153k of the entry part 153c corresponding to the holes are matched and crimping is performed, whereby the second holder is fixed to the carriage frame 153.

The second holder 155 is fixed to the carriage frame 153 with the two bracket parts 155d and 155e across the main body, whereby the bending rigidity of the second holder 155 relative to the carriage frame 153 more improves as compared with the case where the second bracket part 155e does not exist.

Further, the first and second holders 154 and 155 are attached so as to put a corner of the opening 153a of the carriage frame 153, so that the torsional rigidity of the carriage frame 153 with the length direction as an axis may also be enhanced.

The first and second mirrors 151 and 152 have one ends inserted into the openings 154b and 154c of the first holder 154 and opposite ends inserted into the openings 155b and 155c of the second holder 155 and then are in press contact through a spring member (not shown), whereby they are supported on the holders 154 and 155.

The main part of the second carriage 15 is thus assembled.

(Positional Relationship Between First and Second Holders and Optical Path)

Next, the positional relationship between the first and second holders and an optical path will be discussed with reference to FIGs.

Figure 6:
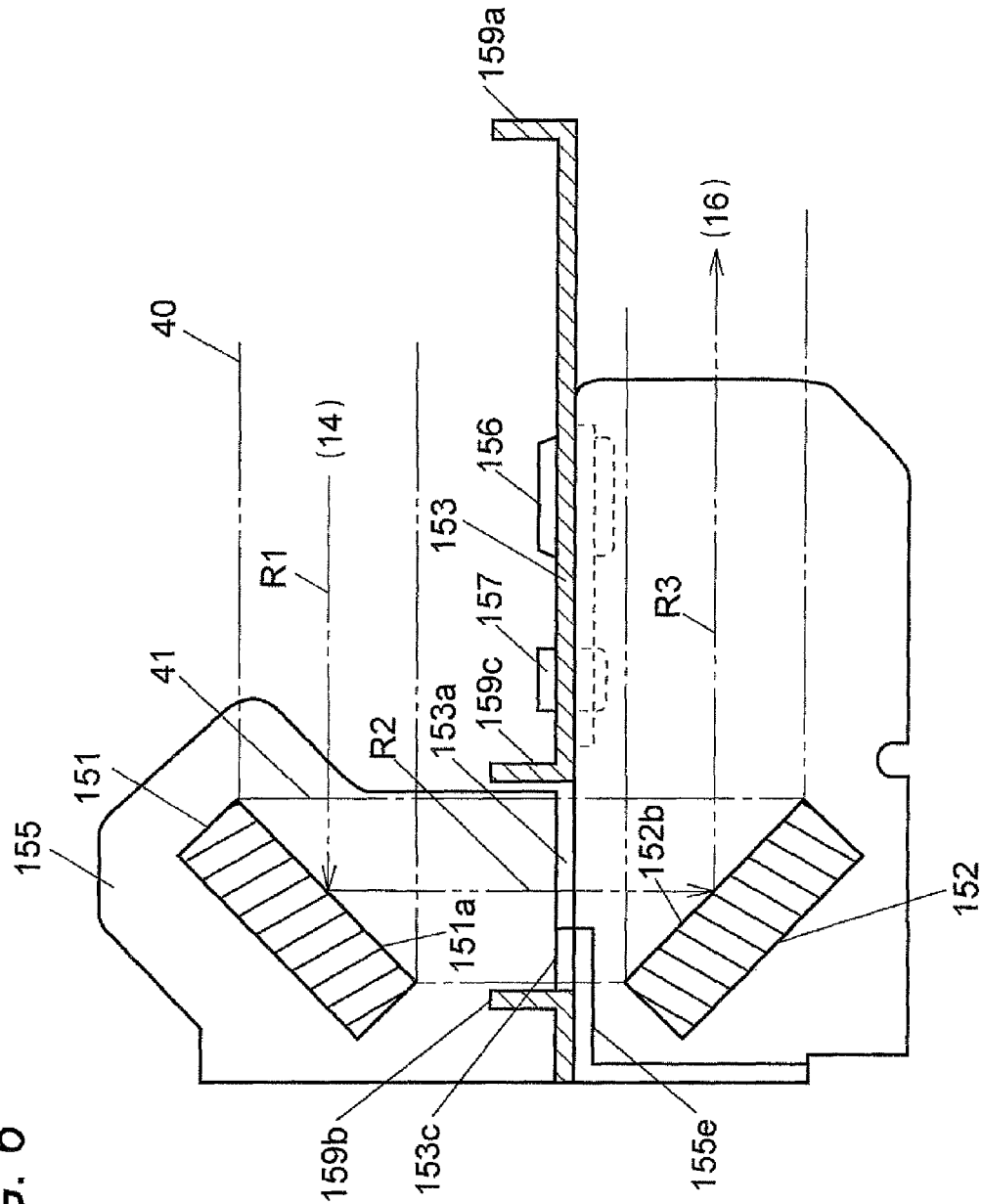
FIG. 6 is a longitudinal sectional view to show one end part of the second carriage according to the exemplary embodiment of the invention.

FIG. 6 is a drawing to show the cross section of the second carriage 15 and is a longitudinal sectional view taken on line A-A in FIG. 3.

The first and second mirrors 151 and 152 are opposed to each other at angle of 90 degrees with a given spacing in a state in which the first and second mirrors 151 and 152 are provided in the first and second holders 154 and 155. At this time, a space 41 provided as a mirror surface 152a of the first mirror 151 a mirror surface 151a of the second mirror 152 are opposed to each other pierces the opening 153a of the carriage frame 153.

That is, the second carriage 15 is configured so that incidence light R1 from the first carriage 14 (see FIG. 2) is received and reflected light R2 reflected on the first mirror 151 passes through the space 41 provided as the mirrors 151 and 152 are opposed to each other, a part of a whole optical path 40 and goes to the second mirror 152 and emission light R3 reflected on the second mirror 152 is emitted toward the image reader 16 (see FIG. 2).

Figure 7:
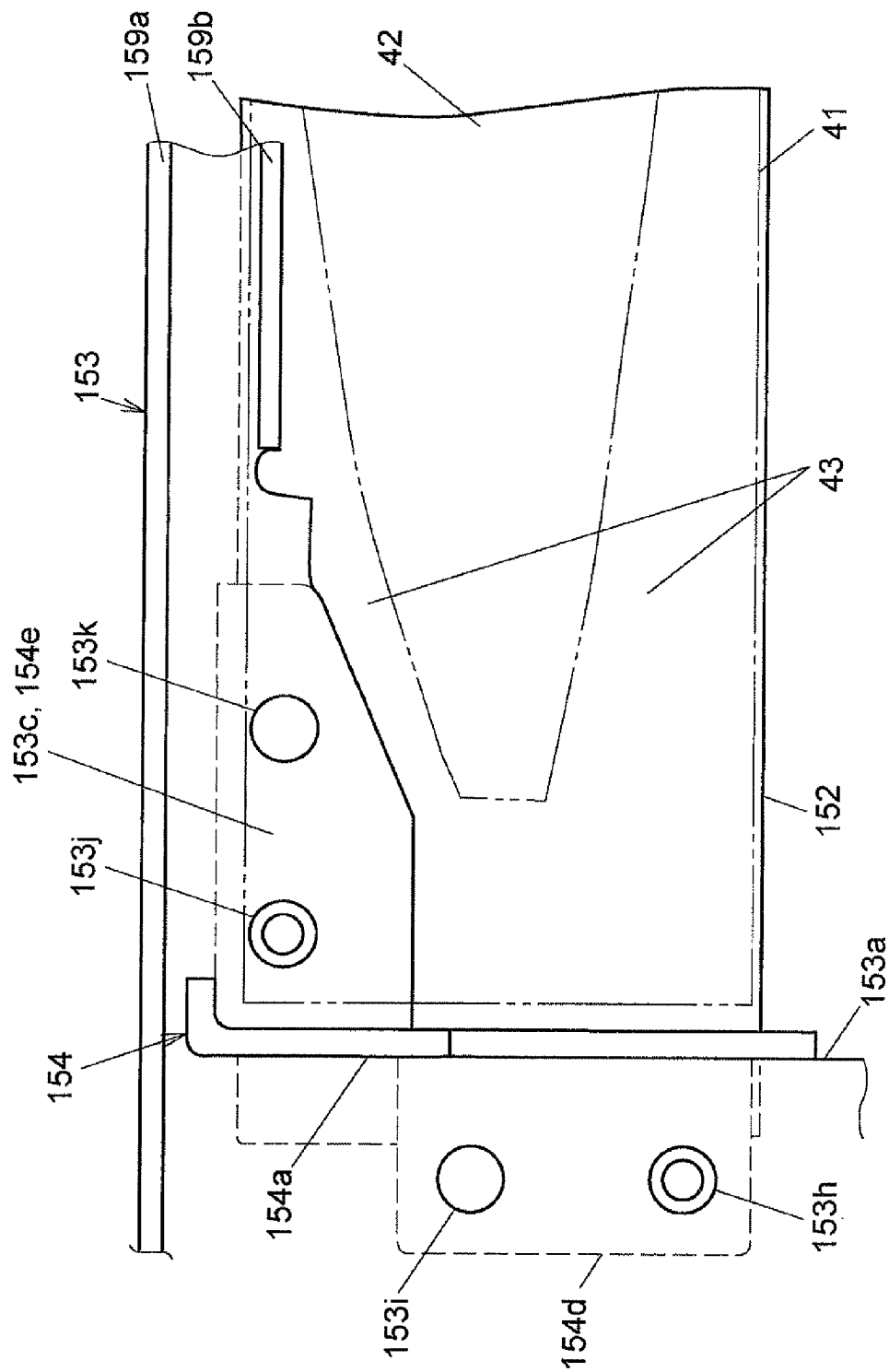
FIG. 7 is plan view to show the one end part of the second carriage on an enlarged scale according to the exemplary embodiment of the invention.

FIG. 7 is plan view to show the front end part of the second carriage 15 on an enlarged scale and represents a state in which the first mirror 151 is removed. As seen in the figure, the entry part 153c formed in a part of the carriage frame 153 and the second bracket part 154e of the first holder 154 fixed to the entry part 153c are placed at a position entering a part of the space 41 (see FIG. 6) provided as the first and second mirrors 151 and 152 are opposed to each other from the outside. Although not shown in the figure, the configuration of the entry part 153c on the back side of the second carriage 15 is also similar to the configuration. The space 41 provided as the first and second mirrors 151 and 152 are opposed to each other forms a part of the whole optical path 40 from the image read position to the CCD 161.

On the other hand, in the first and second mirrors 151 and 152, an image forming area 42 as a use area for reflecting light contributing to image forming in the CCD 161 and a non-image forming area 43 as an unused area for not contributing to image forming exist. In FIG. 7, the boundary between the image forming area 42 and the non-image forming area 43 in the second mirror 152 is indicated by an alternate long and two short dashes line. The image forming area 42 shown in FIG. 7 indicates the maximum range in the range in which the second carriage 15 moves in the vertical scanning direction.

Generally, the image forming area 42 occupies almost all of the mirror surfaces of the first and second mirrors 151 and 152 in the center in the length direction of the mirrors 151 and 152 and is narrow as it approaches both ends of the mirrors 151 and 152. In other words, the non-image forming area 43 exists in the proximity of four corners except the age forming area 42.

As described above, the two entry parts 153c and 153c for supporting the first and second mirrors 151 and 152 and the bracket parts 154e and 155e of the first and second holders 154 and 155 fixed thereto enter a part of the space 41 forming a part of the optical path 40. However, the space 41 shut off by the entry parts 153c, etc., is also a space caught in the non-image forming area 43 comparatively widely existing in the corners of the mirrors 151 and 152. Thus, if a frame structure such that a part of the reflected light R2 reflected on the area as in the exemplary embodiment is adopted, it has no effect on the image read performance and does not degrade the quality of the read image.

(Operation of Image Forming Apparatus 100)

In the image forming apparatus 100, when the user places the document 9 on the sheet feed tray 101a or the platen glass 120 and operates the touch panel 111 or the operation button 112 of the control panel 110 to give a document copy command, the image reader 1 starts to read an image of the document 9. When detecting that the document 9 is inserted into the top of the sheet feed tray 101a, the control section of the image reader 1 controls the automatic sheet feed section 101 and performs read scan of the image of the document 9. The control section discharges the read document 9 to the sheet discharge bed 101b.

When the document 9 is placed on the platen glass 120 (when the document 9 is not detected in the sheet feed tray 101a), the control section of the image reader 1 supplies current to the LEDs 141 provided on the carriage 14 and causes the LEDs 141 to emit light in order in response to a copy command to the control panel 110 and reads one-line image information in the main scan direction of the document 9. The control section performs the scan for each line while moving the first carriage 14 and the second carriage 15 in order in the vertical scanning direction, thereby reading the image of the whole document 9 and converting it into image data. The control section of the image reader 1 transmits the read image data to the optical scanner 250 of the image forming section 2.

The optical scanner 250 of the image forming section 2 applies a light beam modulated based on color image data of YMCK to the photoconductive drum 251 charged by the charger 252 and forms an electrostatic latent image on the surface of the photoconductive drum 251. The electrostatic latent image is developed in toner by the developing device 253 to form a toner image. The toner image on the photoconductive drum 251 is transferred to the intermediate transfer belt 20 by the primary transfer roller 254.

On the other hand, from any one of the first to third trays 31, 32, 33, for example, the first tray 31, a sheet 30 is taken into the sheet conveying passage 37 by the pickup roller 34A and is separated by the separation roller 35A and then is conveyed to space between the secondary transfer roller 26 and the intermediate transfer belt 20 and the toner image on the intermediate transfer belt 20 is transferred to the sheet 30. Then, the toner image transferred to the sheet is fixed by the fixing unit 27 and the sheet 30 is discharged to the discharge bed 29 by the discharge roller 28.

According to the operation of the image forming apparatus 100, the image of the document 9 is copied to the sheet 30.

While the preferred exemplary embodiment of the invention has been described, it is to be understood that the invention is not limited to the exemplary embodiment thereof and various modifications and changes may be made without departing from the spirit and the scope of the invention. For example, the entry part 153c formed in the carriage frame 153 may enter a part of the optical path 40 other than the space 41 provided as the first and second mirrors 151 and 152 are opposed to each other.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. An image reader comprising:
    a light source that applies light to a document;
    a light reception element that receives reflected light reflected by the document;
    an optical member that introduces the reflected light into the light reception element; and
    a hold body that has an entry part which is disposed in a portion not contributing to image formation of the reflected light on the light reception element through the optical member and that holds the optical member, wherein
    the optical member includes a first mirror and a second mirror opposed to the first mirror, and
    the entry part extends from an outside of a space between the first mirror and the second mirror into the space.

2. The image reader according to claim 1, wherein
    the first mirror includes a first nonuse area,
    the second mirror includes a second nonuse area; and
    the space is disposed between the first nonuse area and the second nonuse area.

3. The image reader according to claim 1, wherein
    the hold body includes:
    a frame that is movable in a vertical scanning direction of the image reader, the entry part being included in the frame; and
    a support member that is fixed to the entry part to support the first mirror and the second mirror.

4. The image reader according to claim 3, wherein
    the first mirror is disposed parallel to the second mirror, and
    the entry part is provided on both sides of the hold body in a longitudinal direction of the first mirror.

5. The image reader according to claim 3, wherein
    the support member includes a first fixing portion fixed to the entry part,
    a second fixing portion fixed to a given portion of the frame other than the entry part, and
    a main portion disposed between the first fixing portion and the second fixing portion.

6. An image forming apparatus comprising:
an image reader that includes:
- a light source that applies light to a document;
- a light reception element that receives reflected light reflected by the document;
- an optical member that introduces the reflected light into the light reception element; and
- a hold body that has an entry part which is disposed in a portion not contributing to image formation of the reflected light on the light reception element through the optical member and that holds the optical member; and an image forming section that forms an image read from the document by the image reader on a record medium, wherein
- the optical member includes a first mirror and a second mirror opposed to the first mirror, and
- the entry part extends from an outside of a space between the first mirror and the second mirror into the space.

7. The image reader according to claim 1, wherein the portion in which the entry part is disposed is a portion of an optical path of the optical member, the portion of the optical path not contributing to the image formation.

8. The image forming apparatus according to claim 6, wherein the portion in which the entry part is disposed is a portion of an optical path of the optical member, the portion of the optical path not contributing to the image formation.

9. The image forming apparatus according to claim 6, wherein
- the first mirror is disposed parallel to the second mirror, and
- the entry part is provided on both sides of the hold body in a longitudinal direction of the first mirror.

* * * * *